May 13, 1952
C. G. FLYGARE
2,596,475
AIR BLEED SYSTEM FOR HYDRAULIC
TABLE RECIPROCATING MECHANISM
Filed March 10, 1951
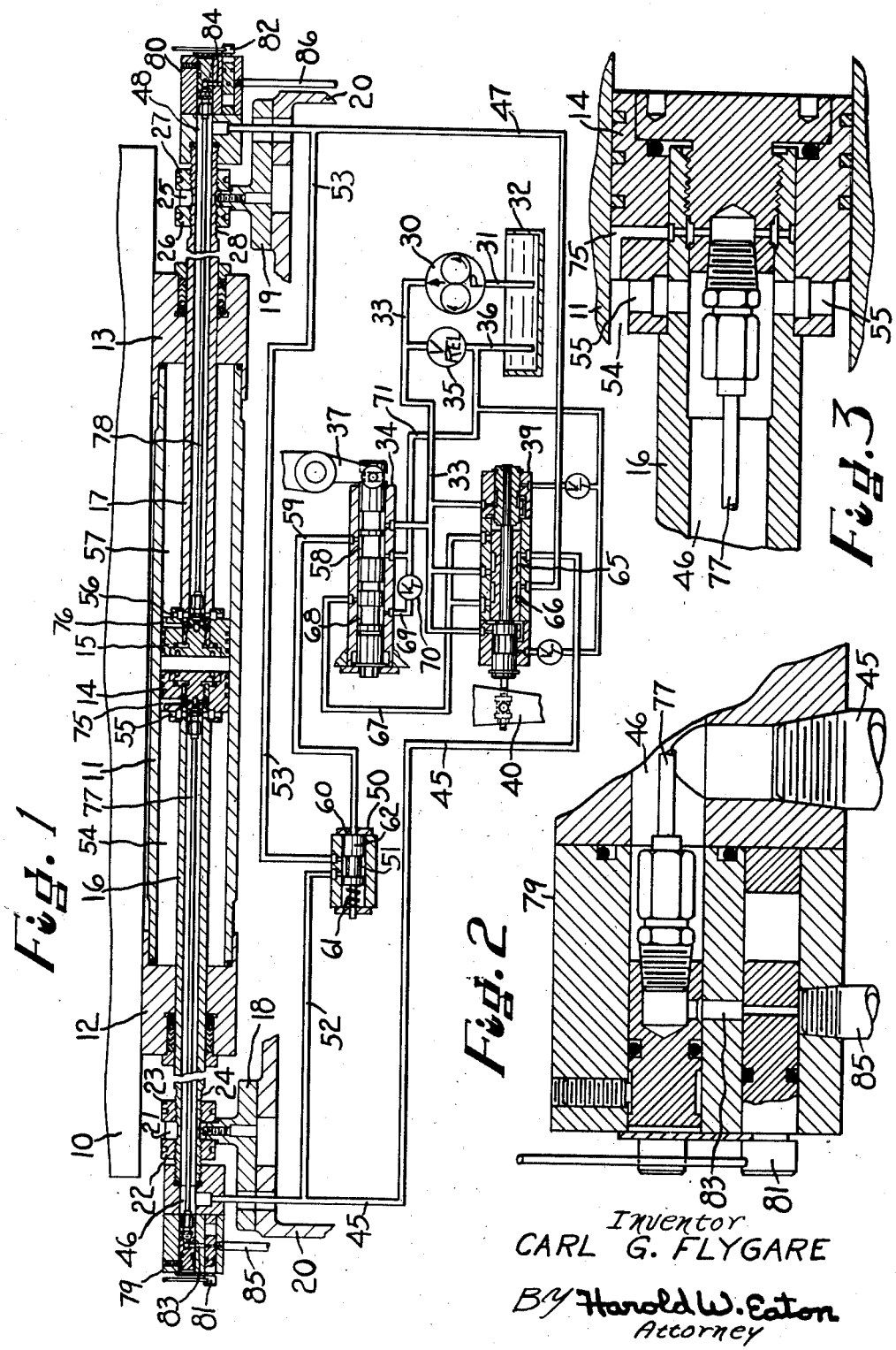
Inventor
CARL G. FLYGARE
By Harold W. Eaton
Attorney Patented May 13, 1952

2,596,475

UNITED STATES PATENT OFFICE 2,596,475

AIR BLEED SYSTEM FOR HYDRAULIC TABLE RECIPROCATING MECHANISM

Carl G. Flygare, Worcester, Mass., assignor to Norton Company, Worcester, Mass., a corporation of Massachusetts Application March 10, 1951, Serial No. 214,936

2 Claims. (Cl. 60—52)

The invention relates to machine tools and more particularly to a hydraulically operated table reciprocating mechanism.

One object of the invention is to provide a simple and thoroughly practical hydraulically operated table reciprocating mechanism. Another object of the invention is to provide a hydraulic table reciprocating mechanism, in which the cylinder reciprocates with the table, with a bleeder system whereby air may be readily bled from the table cylinder during reciprocatory movement thereof. Another object is to provide a bleeder system for a reciprocable table cylinder for bleeding air from the cylinder without the necessity of providing flexible hose connections therefor. Another object of the invention is to provide a bleeder system in which independent bleeder ports are provided in the piston for bleeding air from the cylinder and passing it through a centrally located tube within the hollow piston rod. Another object of the invention is to provide a bleeder system for a hydraulic table reciprocating mechanism in which a pair of pistons are provided having hollow piston rods to connect the pistons with the base of the machine in which independent bleeder ports are provided in the pistons adjacent to the uppermost part of the cylinder so that air may be bled therefrom and passed through bleeder tubes centrally located within the hollow piston rods. Other objects will be in part obvious or in part pointed out hereinafter.

The invention accordingly consists in the features of construction, and arrangements of parts, as will be exemplified in the structure to be hereinafter described, and the scope of the application of which will be indicated in the following claims.

One embodiment of the invention has been illustrated in the drawing, in which:

Fig. 1 is a hydraulic diagram of a hydraulically operated table reciprocating mechanism;

Fig. 2 is a fragmentary sectional view, on an enlarged scale, of one of the bleeder valves for the hydraulic system; and Fig. 3 is a fragmentary sectional view on an enlarged scale, of one of the pistons, showing the independent pressure and bleeder ports therein.

The improved hydraulically operated table reciprocating mechanism has been illustrated in the drawing comprising a longitudinally reciprocable table 10 which is arranged to slide longitudinally on suitable ways (not shown) on a machine base 20. The table 10 is arranged so that it may be reciprocated longitudinally by and automatically controlled by a hydraulically operated reciprocating mechanism comprising a cylinder 11 the opposite ends of which are supported by brackets 12 and 13 mounted on the underside of the table 10. The cylinder 11 contains a pair of spaced pistons 14 and 15. The pistons 14 and 15 are connected by hollow piston rods 16 and 17 respectively with brackets 18 and 19 which are fixedly mounted on opposite ends of the machine base 20.

The bracket 18 is provided with an upwardly extending portion having a U-shaped slot 21 in its upper end to receive a reduced end portion of the piston rod 16. A pair of collars or nuts 22 and 23 are screw threaded onto a threaded portion 24 formed on the left-hand end of the piston rod 16. By manipulation of the collars 22 and 23, the piston rod 16 may be readily clamped to the bracket 18 in the desired adjusted position.

Similarly the bracket 19 is provided with an upwardly extending portion having a U-shaped slot 25 to receive a reduced end portion of the hollow piston rod 17. A pair of collars or nuts 26 and 27 are screw threaded onto a reduced threaded portion 28 of the piston rod 17. By manipulation of the collars 26 and 27, the piston rod 17 may be readily clamped to the bracket 19 in the desired adjusted position. If desired the table 10 together with the cylinder 11 and pistons 14 and 15 may be readily removed from the machine by loosening the collars 22 and 23 and the collars 26 and 27.

A fluid pressure system is provided for supplying fluid under pressure to the table cylinder 11 comprising a motor driven fluid pump 30 which draws fluid through a pipe 31 from a reservoir 32 which may be located either within or outside of the base 20. The pump 30 forces fluid under pressure through a pipe 33 to a manually operable start and stop valve 34. A relief valve 35 is connected in the pipe line 33 to facilitate maintaining the desired operating pressure within the hydraulic system. The relief valve 35 serves to exhaust excess fluid under pressure through a pipe 36 into the reservoir 32.

The start-stop valve 34 is a piston type valve controlled by a manually operable lever 37. The pipe 33 also supplies fluid under pressure to a table actuated reversing valve 39 which is actuated by a lever 40 by means of table dogs (not shown) carried by the table 10. The reversing valve 39 serves to convey fluid under pressure through a pipe 45 into a central aperture 46 within the hollow piston rod 16, or through a pipe 47 into a passage 48 formed within the hollow piston rod 17. A fluid actuated by-pass valve 50 is provided to facilitate by-passing fluid between opposite ends of the cylinder 11 when the parts are in condition for a manual traversing movement of the table 10. As illustrated in Fig. 1, the by-pass valve 50 is a piston type valve having a valve chamber 51 which is connected by a pair of pipes 52 and 53 with pipes 45 and 47 respectively. In this position of the by-pass valve fluid within a cylinder chamber 54 at the left-hand end of the cylinder 11 may pass through a port 55, through the central passage 46 in the piston rod 16, through the pipe 52, through the valve chamber 51, the pipe 53, the central passage 48 in the piston rod 47 and through a port 56 into a cylinder chamber 57 at the right-hand end of the cylinder 11. It will be readily apparent that in this position of the by-pass 50 the table 10 may be readily traversed without the necessity of overcoming fluid pressure in the system, since it may readily by-pass between the cylinder chambers 54 and 57.

When it is desired to start a table reciprocating movement, the control lever 37 may be rocked in a counter-clockwise direction to shift the valve parts so that fluid under pressure in the pipe 33 will pass through a chamber 58 in the start-stop valve 34 and through a pipe 59 into an end chamber 60 formed in the right-hand end of the by-pass valve 50. Pressure within the chamber 60 serves to overcome the compression of a spring 61 to shift the valve 50 so that the valve piston 62 closes off the ports at the ends of the pipes 52 and 53 thereby preventing further by-passing of fluid between the cylinder chambers 54 and 57. At the same time fluid under pressure in the pipe 33 passes through a valve chamber 65 in the reversing valve 39 and through the pipe 45, through the passage 46, the port 55 into the cylinder chamber 54 to move the cylinder 11 and the table 10 toward the left. During this movement of the table fluid within the cylinder chamber 57 may exhaust through the port 56, the passage 48, the pipe 47 into a valve chamber 66 in the reversing valve 39. Fluid exhausting through the valve chamber 66 passes through a pipe 67, through a chamber 68 formed in the start-stop valve 34, and out through a pipe 69, and a throttle valve 70 and through a pipe 71 into the pipe 36 to exhaust into the reservoir 32. The setting of the throttle valve 70 determines the rate of movement of the table 10.

Similarly when the table actuated lever 40 is shifted into a reverse position, the reversing valve parts are shifted so that fluid under pressure passes through the pipe 47, through the passage 48, the port 56 into the cylinder chamber 57 to start movement of the cylinder 11 and table 10 toward the right.

In order to attain the main object of this invention, a suitable bleeder system is provided whereby air leaking into the hydraulic system and the cylinder 11 may be readily bled therefrom when desired. It is preferable to arrange the bleeder system so that air may be bled from the cylinder 11 manually through suitable connections and return to the reservoir 32. In the preferred construction, bleeder ports 75 and 76 are provided in the upper portions of the pistons 14 and 15 respectively so that air accumulating within the cylinder 11 rises to the uppermost part of the cylinder and may readily be withdrawn therefrom. The bleeder ports 75 and 76 are connected through bleeder tubes 77 and 78 extending through the hollow apertures 46 and 48 in the hollow piston rods 16 and 17 respectively. A pair of valve casings 79 and 80 are supported on the outer ends of the piston rods 16 and 17 respectively. The casings 79 and 80 are provided with manually operable bleeder valves 81 and 82 respectively. The valves 81 and 82 are connected by passages 83 and 84 with the bleeder tubes 77 and 78 respectively. When the valve 81 or the valve 82 is opened fluid including air adjacent to the top portion of the cylinder 11 may be readily exhausted through the valves 81 and 82 and passed through pipes 85 and 86 which returns the air laden fluid to the reservoir 32. It will be readily apparent from the foregoing disclosure that the bleeder valves 81 and 82 may be normally closed and opened as desired to bleed air from the cylinder 11. If desired the valves 81 and 82 may be partially opened so that during the reciprocatory movement of the table 10 and cylinder 11, a continuous bleeding of air and fluid from the upper portion of the cylinder 11 may be obtained.

It will thus be seen that there has been provided by this invention apparatus in which the various objects hereinabove set forth with many thoroughly practical advantages are successfully achieved. As many possible embodiments may be made of the above invention and as many changes might be made in the embodiment above set forth, it is to be understood that all matter hereinbefore set forth, or shown in the accompanying drawing, is to be interpreted as illustrative and not in a limiting sense.

I claim:

1. In a machine tool having a base, a longitudinally reciprocable table thereon, a hydraulic cylinder fixedly mounted on said table, a piston therein, a hollow piston rod connected with said piston, a bracket adjacent to one end of said base to support the other end of said piston rod, a reversing valve to convey fluid under pressure through said rod into the cylinder, a fluid reservoir, means including a pump to supply fluid under pressure, and a bleeder system therefor including a bleeder port in said piston adjacent to the upper portion of said cylinder, a bleeder tube connected therewith and extending through said hollow piston rod, a manually operable bleeder valve at the outer end of said tube, and a pipe connecting said bleeder valve with the reservoir whereby air and fluid bled from the cylinder is returned to the reservoir.

2. In a machine tool having a base, a longitudinally reciprocable table thereon, a hydraulic cylinder fixedly mounted on said table, a pair of spaced pistons within said cylinder, a pair of hollow piston rods connected with said pistons, brackets on opposite ends of said base to support the outer ends of said piston rods, a reversing valve to convey fluid under pressure through said rods into the cylinder, a reservoir, means including a pump to supply fluid under pressure, and a bleeder system therefor including a bleeder port in each of said pistons adjacent to the upper portion of said cylinder, a separate bleeder tube connected with each of said ports and extending through said hollow piston rods, a manually operable bleeder valve on the outer end of each of said tubes, and separate pipes connecting said bleeder valves with said reservoir whereby air and fluid bled from said cylinder is returned to the reservoir.

CARL G. FLYGARE.

REFERENCES CITED

The following references are of record in the file of this patent:

UNITED STATES PATENTS

| Number | Name | Date |
| --- | --- | --- |
| 1,890,244 | Barrett et al. | Dec. 6, 1932 |
| 1,938,772 | Ernst et al. | Dec. 12, 1933 |
| 2,037,262 | Parsons | Apr. 14, 1936 |